Jan. 19, 1960 L. C. CUNNINGHAM 2,921,398
FISHING POLE
Filed Feb. 17, 1958 2 Sheets-Sheet 2
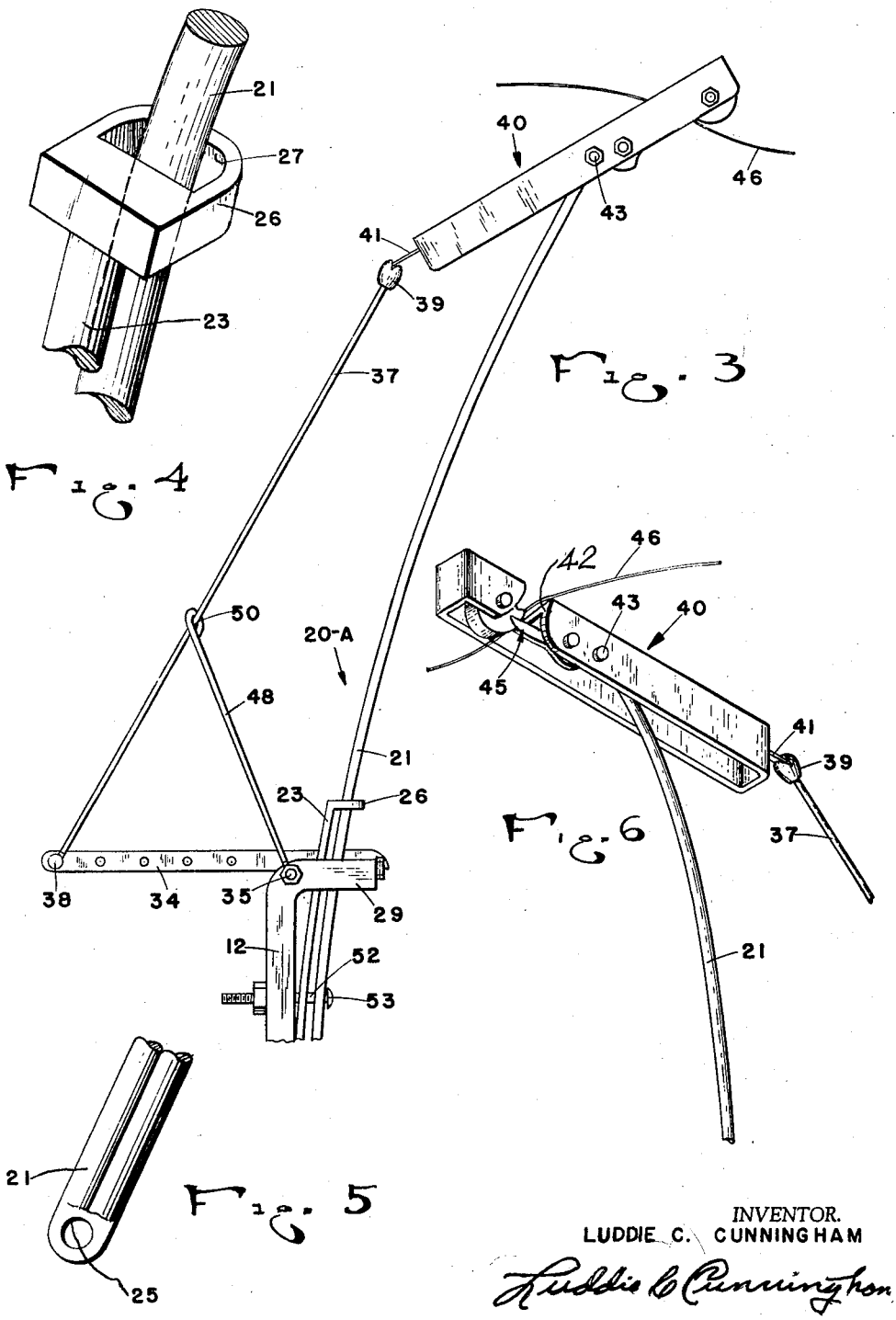
INVENTOR.
LUDDIE C. CUNNINGHAM United States Patent Office 2,921,398
Patented Jan. 19, 1960

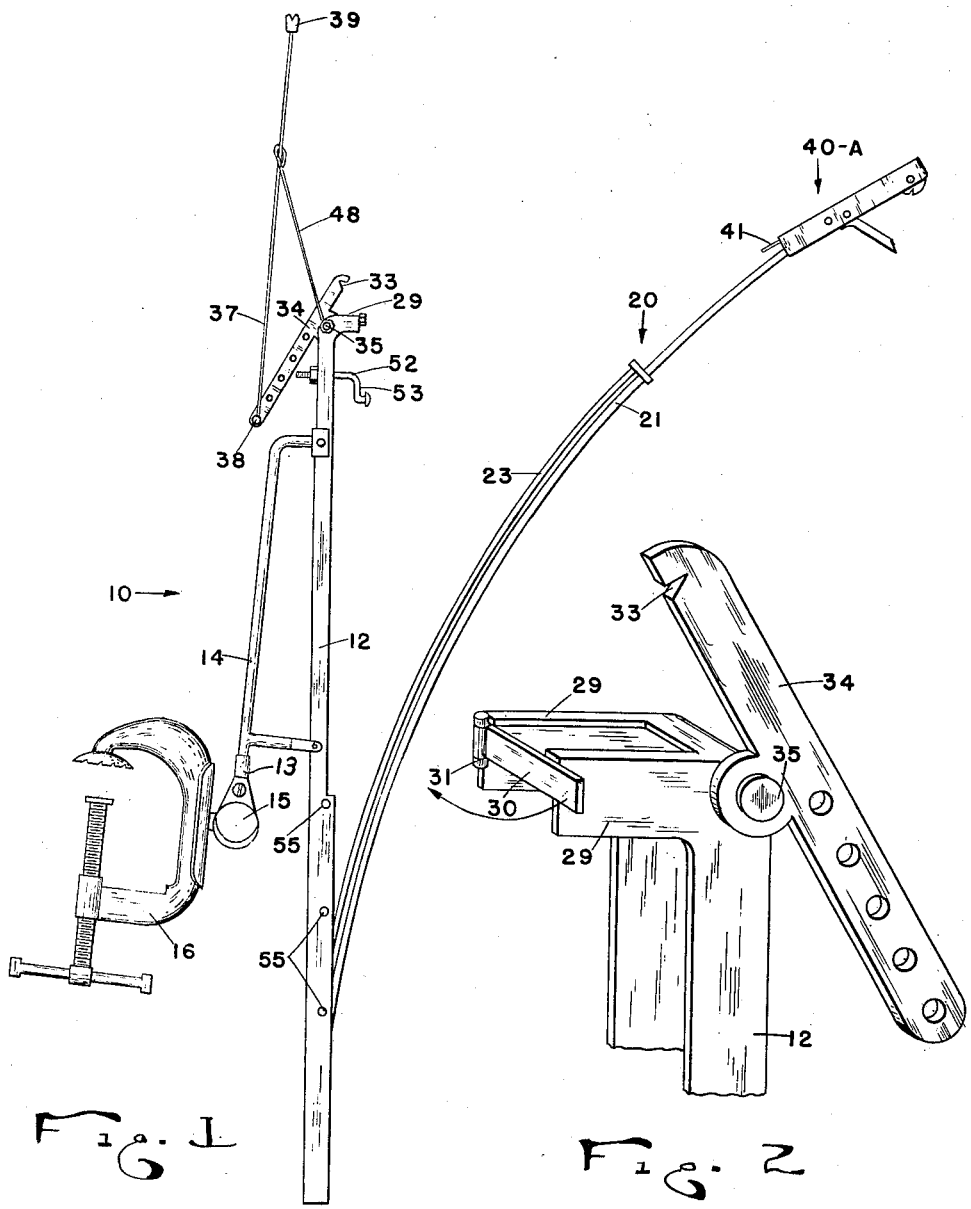

2,921,398

FISHING POLE

Luddie C. Cunningham, Dayton, Ohio

Application February 17, 1958, Serial No. 715,659

1 Claim. (Cl. 43—15)

This invention relates to fishing equipment and more particularly to an accessory for use with conventional fishing equipment.

It is an object of the present invention to provide a substantially automatic device that can be readily attached to any available object to exert a quick and hard jerk upon a fishing line in response to a slight tug thereof by a fish.

Another object of the present invention is to provide a line pulling device for conventional fishing apparatus that is much more sensitive to the pull of a fish upon the line and can react more quickly to such pull to exert a quick and sufficiently hard snapping action upon the line to more firmly impale the fish upon the hook.

Still another object of the present invention is to provide a line pulling device of the above type that can act more quickly than the fisherman to exert the necessary jerk upon the line to prevent the escape of the fish and which does not require the attention of the operator at all times.

Other objects of the invention are to provide a fishing device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a line pulling device made in accordance with the present invention in the released position;

Figure 2 is an enlarged fragmentary perspective view of the opposite side of the releasable latch device forming a part of the present invention;

Figure 3 is an enlarged fragmentary side elevational view similar to Figure 1, showing the parts in the initial operative position;

Figure 4 is an enlarged fragmentary perspective view showing the engagement of certain parts;

Figure 5 is a view similar to Figure 4, showing still other parts of the present invention; and Figure 6 is a fragmentary perspective view, with parts broken away, of certain parts of the line engaging elements shown in Figure 3.

Referring now more in detail to the drawing, fishing apparatus 10 made in accordance with the present invention is shown to include an elongated channel shaped member 12 that has a support bracket 14 rigidly secured thereto. A universal joint connection 15 between the bracket 14 and a fastening clamp 16, enables the channel member 12 to move freely in any direction, so that the clamp 16 may be secured to any stationary object, such as a limb, side of the boat, etc., without interfering with the normal movements of the fishing line associated with this equipment. A swivel connection 13 between the bracket 14 and the joint 15 is designed to permit the fish pole and assembly to be tilted to the right or left. Thus, if it is attached to the fishing boat and the current is flowing in either direction, it will carry the bait to the right or left of the assembly.

A spring actuated whip 20 is carried at one end upon one end of the channel member 12. This whip includes an arcuate section 21 of spring rod that has a bolt receiving opening 25 at its lower end for attachment to the channel. A guide bar 23 welded to the lower end of the section 21 of spring rod has a plate 26 welded to its upper end that is provided with an enlarged opening 27 which loosely and slidably receives the spring rod 21 to restrict the movement of the rod to the single plane normal to the base of the channel member 12 and further serves to provide additional spring to the rod 21. The upper end of the channel member is provided with a pair of spaced parallel feet 29 which extend laterally outwardly therefrom to define a space for receiving a mid portion of the whip 20. A latch bar 30 pivotally supported at one end by means of a hinge 31 is movable between a normally closed position and a released position by means of a trigger lever 34 having an engagement shoulder or a notch 33 at one end in releasable engagement with the opposite end of the latch bar 30. In the closed position, the latch bar secures the whip in the retracted position 20a shown in Figure 3, against the natural tendency of the spring rod 21 to snap outwardly to the extended position 20 shown in Figure 1. This trigger lever 34 is rotatably supported upon one side of the channel 12 by means of a bolt 35 that extends transversely therethrough.

A push rod 37 is rotatably carried upon its lower end by means of a pivot pin 38 that secures it to the outer end of the trigger lever 34. The upper end of the push rod is provided with a socket 39 for releasable engagement with a stop plate 41 associated with one end of a one way fishing line brake 40. This brake unit is pivotally carried upon the outer end of the spring rod 21 by means of a pivot pin 43 for rotational movement between an initial position inclined to the longitudinal axis of the spring rod 20a in the normal retracted position, and an adjusted position 40a shown in Figure 1 when the whip is released. The fishing line 46 extending through the one way stop mechanism 45 of the brake is permitted to be drawn therethrough in a direction toward the reel of the fishing pole, but prevents movement thereof in an opposite direction in response to the pull of a fish. Thus, when a fish pulls upon the line 46, the brake housing is rotated about its pivotal connection 43 to exert a push upon the rod 37, thus rotating the trigger lever 34 to a release position to enable the latch bar 30 to move outwardly and thus release the whip 20a for movement to the extended position 20 shown in Figure 1. During this movement, a quick and hard pull is exerted upon the line 46, thus securely impaling the fish upon the hook, and allowing the line to be released from the mechanism by passing sidewise out of the brake through the side opening 42.

A guide rod 48 pivotally supported upon the opposite end of the pivot bolt 35 of the trigger lever 34 has a loop 50 at its opposite end for guiding the push rod 37 during this pushing movement. A safety latch 52 having a transversely extending leg 53 is also provided to safely maintain the whip in the loaded position shown in Figure 3 during handling thereof, following which the latch may be rotated to the release position shown in Figure 1 after the device has been properly positioned for use. A plurality of longitudinally spaced apart setting holes 55 are disposed along the channel member 12 so that a stop pin may be inserted in a selective one of these holes to control the maximum movement of the whip 20. Thus, by placing a stop pin through the holes closer to the center of the channel 12, the length of the whipping stroke may be substantially shortened as compared to the movement permitted when the stop pins are placed further toward the outer end of the channel member.

While various changes may be made in the detail construction, it shall be understood that such changes shall be within the spirit and scope of the present invention as defined by the appended claim.

What I claim as new and desire to protect by Letters Patent of the United States is:

In a device of the character described in combination, a C-clamp, an elongated channel-shaped upright member, a supporting bracket rigidly secured to one side thereof, said bracket comprising a horizontal top portion, a horizontal lower portion, and an upright connecting portion which extends below said horizontal lower portion and forming the lower supporting end of said bracket, a swivel connection mounted upon the lower supporting end of said bracket, a universal joint connected to the lower end of said swivel connection, said C-clamp comprising a pair of arms, a yoke, and a movable spindle and means thereon for clamping it to a supporting object, said universal joint integrally secured to the yoke of said C-clamp, a spring actuated whip connected at its lower end between the lower side portions of said channel-shaped member, there being a plurality of longitudinally spaced apart setting holes disposed along said channel member above the point of connection of said whip with said channel member to removably receive a stop pin selectively arranged in one of said holes to control the maximum movement of said whip, a guide bar arranged in juxtaposition with said spring whip, said bar integrally secured at its lower end with the lower end portion of said whip, the upper end of said bar having an angular plate member provided with an enlarged opening which loosely and slidably receives said whip to restrict the movement of said whip to the single plane normal to the base of said channel member, latch means carried by the upper end of said channel-shaped member, said latch means embodying a fork with a pair of outstanding arms defining a slot and adapted to extend upon opposite sides of said whip, a latch bar pivotally connected to the outer end of one of said arms and resting on the outer end of the opposite arm of said fork and having an engagement portion extending laterally beyond said opposite arm when bridging said slot, and a notched straight trigger lever pivotally connected to said fork and having an engagement shoulder upon its lower edge portion of its rear end releasably to engage said engagement portion of said latch bar when said lever is in a predetermined pivotal position relative to said fork, said lever being adapted to be frictionally engaged by a fishing line passing through a brake mounted in the outer end of a brake housing pivotally secured upon the upper terminal end of said whip, a stop plate extending from the opposite end of said housing, an upwardly extending rod rotatably carried upon its lower end by means of a pivot pin to the forward end of said trigger lever, a socket mounted upon the upper end of said rod for releasable engagement with said stop plate, and said latch means responsive to a pull upon said line to release said stop plate from said socket, allowing said rod to drop and automatically open said latch bar to release said whip held within said fork for a snap movement out of its flexed state to jerk said line.

References Cited in the file of this patent

UNITED STATES PATENTS

| | | |
|---|---|---|
| 916,891 | Schildbach | Mar. 30, 1909 |
| 1,856,477 | Gerline | May 3, 1932 |
| 2,810,981 | Lattau | Oct. 29, 1957 |
| 2,821,041 | Hughes | Jan. 28, 1958 |